(12) United States Patent
Schubart

(10) Patent No.: US 6,395,870 B1
(45) Date of Patent: *May 28, 2002

(54) PROCESS FOR PREPARING BIODEGRADABLE POLYMERS HAVING REPEATING SUCCINYL UNITS

(75) Inventor: Ruediger Schubart, Bergisch Gladbach (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/408,899

(22) Filed: Sep. 29, 1999

(30) Foreign Application Priority Data

Oct. 5, 1998 (DE) .......................... 198 45 639

(51) Int. Cl.⁷ .................. C08G 69/00; C08G 69/10
(52) U.S. Cl. .................. 528/328; 525/419; 525/420; 525/421; 526/64; 526/66
(58) Field of Search ................. 528/328, 363, 528/392; 525/421, 419, 420; 526/64, 66

(56) References Cited

U.S. PATENT DOCUMENTS

| | | | |
|---|---|---|---|
| 4,839,461 A | 6/1989 | Boehmke ................. | 528/363 |
| 5,142,062 A | 8/1992 | Knebel et al. ........... | 548/545 |
| 5,288,783 A | 2/1994 | Wood ..................... | 525/418 |
| 5,269,587 A | 3/1994 | Sumner, Jr. et al. ...... | 528/281 |
| 5,371,180 A | 12/1994 | Groth et al. ............. | 528/363 |
| 5,543,490 A | 8/1996 | Groth et al. ............. | 528/328 |
| 5,612,447 A | 3/1997 | Freeman et al. ......... | 528/328 |
| 5,747,635 A | 5/1998 | Kroner et al. ........... | 528/328 |
| 5,770,553 A | 6/1998 | Kroner et al. ........... | 510/360 |
| 5,919,894 A | * 7/1999 | Schubart ................. | 528/328 |
| 6,001,798 A | 12/1999 | Baur et al. .............. | 510/490 |
| 6,093,789 A | * 7/2000 | Schubart et al. ......... | 528/328 |

FOREIGN PATENT DOCUMENTS

WO        95/02007        1/1995

* cited by examiner

Primary Examiner—P. Hampton-Hightower
(74) Attorney, Agent, or Firm—Joseph C. Gil; Diderico van Eyl

(57) ABSTRACT

A process for preparing biodegradable polymers having repeating succinyl units, characterized in that an optionally substituted 1,4-butanedicarboxylic acid, or a 1,4-butanedicarboxylic acid derivative is reacted with an acid anhydride.

18 Claims, No Drawings

PROCESS FOR PREPARING BIODEGRADABLE POLYMERS HAVING REPEATING SUCCINYL UNITS

FIELD OF THE INVENTION

The invention relates to a process for preparing biodegradable polymers having repeating succinyl units, especially polyaspartic acid PAA and polysuccinimide (PSI).

BACKGROUND OF THE INVENTION

The preparation and use of polysuccinimide and polyaspartic acid and their derivatives has long been the subject of numerous publications and patents.

U.S. Pat. No. 4,839,461, (EP-A 0 256 366) describes the preparation of PAA from maleic anhydride (MAA), water and ammonia. MAA is reacted in aqueous medium with the addition of concentrated ammonia solution and is subsequently polymerized. During this polymerization, the mass becomes initially highly viscous and then solid-porous, which necessitates complex technical handling.

U.S. Pat. No. 5,296,587, describes the preparation of PSI from MAA, water and ammonia. MAA is hydrolyzed in water to maleic acid and then converted to the ammonium salt with concentrated ammonia solution. In a stirred reactor, the water is evaporated from the solution and subsequently the monoammonium salt is polymerized in bulk at temperatures above 170° C. to PSI. In this case, the mass is reacted in a number of hours by way of highly viscous phase states and on to solid PSI, and is subsequently hydrolyzed to PAA.

U.S. Pat. No. 5,288,783, describes the preparation of PAA from maleic acid or fumaric acid, water and ammonia. MAA is mixed with water in a stirred vessel and is reacted with cooling to give maleic acid. The mono-ammonium salt of maleic acid is prepared by adding concentrated ammonia solution. Subsequently, the water present is evaporated and the dry monoammonium salt is polymerized at temperatures from 190 to 350° C. An alternative proposal is to subject the monoammonium salt, which is present in aqueous solution, to further processing by extrusion at temperatures from 160 to 200° C. to form PSI. The PSI, prepared by one of the two process pathways, is subsequently subjected to alkaline hydrolysis to give PAA.

EP-A 593 187, describes the preparation of PSI by thermal polymerization of maleamic acid at temperatures from 160 to 330° C., in a reaction period of from 2 minutes to 6 hours. Reference is also made to polycondensation in a solvent, using condensation auxiliaries.

DE-A 4 023 463 (U.S. Pat. No. 5,142,062) describes a process for preparing polysuccinimide in the presence of phosphoric acids. DE-A 4 221 875 (WO 94/01486) describes the preparation of so-called modified polyaspartic acids by polycondensation of aspartic acid with further compounds, optionally in the presence of phosphoric acids or derivatives thereof. From WO 95/02007, it is known to prepare polymers of aspartic acid by heating MAA and acid derivatives of ammonia. Phosphoric acid is one of the acids specified. Of the corresponding salts, however, only diamonnium hydrogen phosphate and monoammonium dihydrogen phosphate are mentioned. EP-A 604 813 (DE-A 4 244 031) discloses a process for preparing PSI and PAA from maleamic acid in which MAA and ammonia are reacted to form maleamic acid and the maleamic acid is subjected to a polymerization which can be conducted in the presence of phosphoric acids and polyphosphoric salts.

U.S. Pat. No. 5,919,894, (WO 96/34908), each disclose polymers with repeating succinyl units, in particular, polysuccinimide and polyaspartic acid, that are prepared using triammonium salts, in particular, triammonium phosphates. The patent describes the synthesis of PAA from MAA and triammonium phosphate.

DE 4 322 410, furthermore, shows the synthesis path to PSI or PAA via the reaction of maleic anhydride with ammonium carbonate, which is accompanied by heating.

Disadvantages of the known processes are that they are very complex and in many cases lead to products having unsatisfactory biodegradeability, and also that purification during the production process entails considerable expense. In the case of the condensation of aspartic acid with phosphoric acid, condensation is necessarily followed by laborious separation of the phosphoric acid.

The object of the invention is therefore to provide an improved process for preparing polymers having repeating, fully biodegradable succinyl units, especially PSI and PAA, in which it is no longer necessary to conduct virtually any laborious purification operations after the condensation.

The object of the invention is achieved by—and consequently, the invention provides—a process for preparing biodegradable polymers having repeating succinyl units, characterized in that an 1,4-butanedicarboxylic acid component, e.g., an optionally substituted 1,4-butanedicarboxylic acid or a derivative of 1,4-butanedicarboxylic acid is mixed with an acid anhydride such as acetic anhydride, first of all at room temperature if desired. The resulting mixture is then reacted by polycondensation.

SUMMARY OF THE INVENTION

The process relates to a process for preparing a biodegradable polymer having repeating succinyl units. The process includes the steps of (a) mixing (i) a 1,4-butanedicarboxylic acid component comprising a member selected from the group consisting of unsubstituted 1,4-butanedicarboxylic acid, substituted 1,4-butanedicarboxylic acid, 1,4-butanedicarboxylic acid derivatives, with (ii) an acid anhydride to form a mixture, and (b) reacting the mixture by polycondensation. The polycondensation is brought about by the steps of (i) raising the temperature of the mixture to form a component including a member selected from the group consisting of polysuccinimides and polyaspartic acids, and (ii) simultaneously converting the acid anhydride to the acid corresponding to the acid anhydride by water that is liberated during condensation. The process also involves removing water and the acid corresponding to the acid anhydride from the mixture, preferably with distillation. These and other features, aspects, and advantages of the present invention will become better understood with reference to the following description and appended claims.

DESCRIPTION OF THE INVENTION

For the purposes of the present invention, derivatives of optionally substituted 1,4-butanedicarboxylic acid include, for example, salts of and substitution products, such as hydroxy and amino-substituted dicarboxylic acids. In the process of the invention, it is preferred to employ aspartic acid (ASP). It is, of course, also possible to employ monomaleamide. If monoammonium-maleic acid is employed, a preliminary thermal reaction by heating at about 120–150° C. should be carried out first and then the polycondensation to give polysuccinimide should be achieved by addition of acetic anhydride, with further heating.

Where ASP and acetic anhydride are employed, the ratio of ASP to acetic anhydride is preferably 1:1. However, excesses of acetic anhydride of up to 50 mol % can also be used.

Surprisingly, the process of the invention not only gives polymers having repeating succinyl units that are virtually free from substances accompanying the reaction but also gives reaction products which are 100% biodegradable.

The polymers prepared in accordance with the invention preferably feature repeating succinyl units having at least one of the following structures:

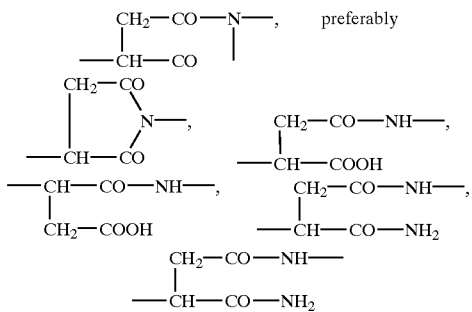

Furthermore, depending on the embodiment, it is also possible for iminodisuccinate units to be present, preferably at least one of the following structures:

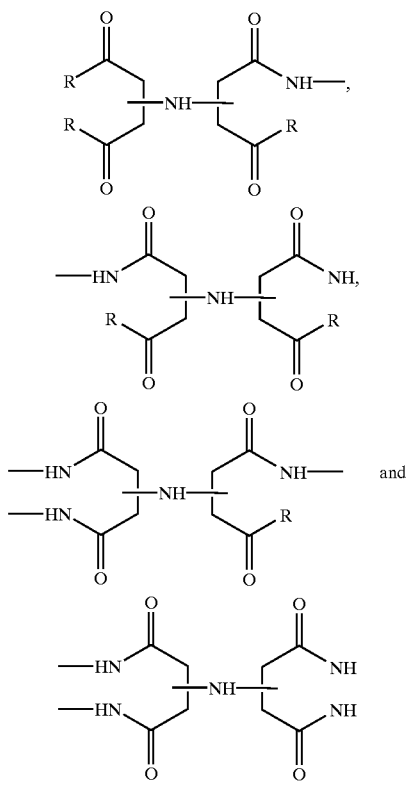

wherein R represents OH, O—$NH_4^+$ or $NH_2$.

The iminodisuccinate units present can be randomly distributed in the polymer or, preferably, in end-group form. Based on the sum of all repeating units, the iminodisuccinate unit is present optionally in a proportion of at least 0.1 mol %. The molar ratio of the iminodisuccinate units incorporated in the polymer to the sum of all monomer units incorporated in the polymer is preferably from 0.1 mol % to 99 mol %, preferably from 1 mol % to 50 mol % and, with particular preference, from 2 mol % to 25 mol %.

In addition, further repeating units may be present as a result of an appropriate reaction regime and appropriate choice of starting materials, examples of such units being a) maleic acid units of the formula

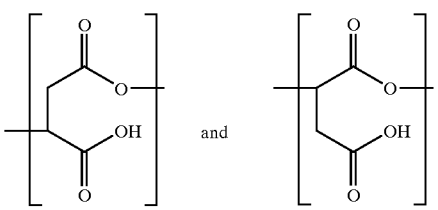

b) maleic acid and fumaric acid units of the formula

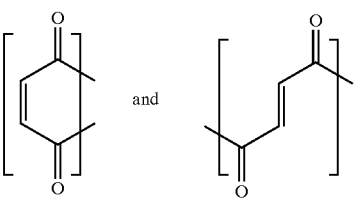

The resultant polymerization product which contains polysuccinimide units can be hydrolyzed conventionally to polyaspartic acid and its salts.

As far as further embodiments are concerned, particular preference is given to the following processes, conditions, and apparatus. The starting materials can be employed individually or in mixtures, in bulk or in solution. In one preferred embodiment, the process takes place in the melt. The reaction of the starting materials can likewise be conducted in the presence of a solvent. Suitable solvents are water, lower alcohols, polar aprotic solvents, such as dimethylformamide, formamide and ureas, N-alkylpyrrolidone, sulpholane, acetone, dimethyl sulphoxide, polyalkylene glycols, polyalkylene glycol monoalkyl ethers and polyalkylene glycol dialkyl ethers. Also suitable are supercritical gases such as carbon dioxide and ammonia. Particular suitability is possessed by water and/or formamide and also acetic acid.

The thermal polycondensation is generally conducted at temperatures between 100° C. and 300° C., preferably between 120° C. and 250° C. and, with particular preference, between 140° C. and 200° C. In this context, the residence time can be extended to up to 600 minutes.

If desired, it is also possible toward the end of the polycondensation, to meter in MAA or further maleic acid and a base. Suitable bases are alkali metal hydroxides and alkaline earth metal hydroxides, amines or carbonates. Preferred bases include sodium hydroxide solution, potassium hydroxide solution, sodium carbonate or potassium carbonate, ammonia, triethanolamine, diethylamine, diethanolamine, alkylamines, and the like.

One preferred embodiment of the general process described above is characterized in that the reaction of the starting materials takes place adiabatically and the heat of reaction liberated during this reaction is used in order to bring the reaction mixture to polymerization temperature in order to carry out at least partial polymerization of the nitrogen-containing derivative of low molecular mass to give a polymer having biodegradable repeating succinyl units.

Apparatus suitable for the thermal polymerization includes in principle all such apparatus which, with a narrow residence-time distribution of the viscous liquid phase, permits the necessary minimum residence time for polymerization and at the same time permits at least partial evaporation of the solvent, especially water, and of the acetic acid and/or water formed during the reaction. The acid (acetic acid) and the water can be removed from the mixture by any suitable means, e.g., distillation, evaporation.

Preferred apparatus for the thermal polymerization, therefore, is all such apparatus which features a defined residence time with a narrow residence-time distribution for the solid or highly viscous liquid phase and at the same time permits good temperature control by at least partial evaporation of the solvent (water, solvent or acetic acid) and/or of the water of reaction or acetic acid formed during the polymerization. Possible examples of such preferred apparatus are:

a) delay tubes, b) high-viscosity reactors, preferably screw reactors, List reactors or Buss reactors, c) dryers, preferably paddle dryers, spray dryers, plate dryers, belt dryers, d) cascades of stirred vessels, e) thin-film evaporators, f) multi-phase helical-tube reactors (DT 1 667 051, DE-A 219 967).

In a further embodiment of the process of the invention, one starting component can be metered in at two or more points along a tube reactor or multi-phase helical-tube reactor in an appropriate manner so as to allow the production of an optimum temperature profile. This avoids the incidence of excessively high temperatures, which can lead to instances of product damage. The number of additional metering points (not including the metered addition into the mixing nozzle at the tube entrance or multi-phase helical-tube reactor entrance) is preferably in the range of up to 10. The nature of the feed is chosen so as to provide good mixing with the reaction solution.

The metering points also serve to add any other comonomers that are to be added, such as amino acids, for example glycine, and the like.

At the same time, the last metering point, which lies shortly before the reactor exit, can be used to add one of the above-mentioned bases and, if desired, further starting material in order to achieve grafting of the polymer with, for example, iminodisuccinate units.

Depending on the starting materials used, the starting materials can be mixed at temperatures between 0° C. and 200° C. The starting materials used are reacted at from 100 to 350° C., preferably from 120 to 260° C. and, with particular preference from 140 to 240° C. To support the temperature regime during the reaction, it is also possible to employ cooling and heating media. In addition, product/starting material regions having different temperatures in the reaction system can be brought into contact directly or indirectly for the purpose of heat exchange.

The residence time within the reactor system is preferably chosen so as to ensure complete reaction of the starting material that is employed in a substoichiometric amount, for example aspartic acid. For virtually complete polymerization, it may be necessary to subject the monomer and oligomer mixture that is obtained shortly after mixing in the first reaction section, for example in a stirred reactor, to reaction in a further apparatus mentioned above, preferably a high-viscosity reactor. With particular preference, however, it is possible to employ a high-viscosity reactor in which the complete polymer formation can be carried out. Depending on their water, acetic acid and/or solvent content, and owing to the reaction enthalpy that is released, the reaction products obtained are hot solutions or water-containing melts which comprise solvent and acetic acid.

The reaction enthalpy can largely be utilized in the reactor. This results in an optimum thermal regime with low investment costs and operating costs for an industrial plant, which leads to a high level of economy.

When the oligomer-containing melts are employed in a high-viscosity reactor, in one preferred reaction regime, the rate of reaction can be increased considerably by the viscous mass, which has already been preheated and which owing to the heat of reaction liberated has been partially depleted of solvent by evaporation.

The process can be carried out continuously or batchwise. Preferred reactors are high-viscosity reactors, examples being screw, List and Buss reactors.

The primary polymer products can be first pulverized and then washed with water, leaving the polysuccinimide which, in a conventional manner, can be hydrolyzed to PAA or to salts, for example, sodium-polyaspartic acid.

Alternatively, the primary polymerization products can be converted to a PAA-containing copolymer salt by reaction with a base, optionally in the presence of water. This conversion of PSI-containing copolymers to PAA-containing copolymers takes place by hydrolysis in a suitable apparatus. A suitable pH in this case is preferably between 5 and 14. In a particularly preferred form, a pH of 7 to 12 is chosen, in particular by the addition of a base. Suitable bases are alkali metal hydroxides and alkaline earth metal hydroxides, amines or carbonates such as sodium hydroxide solution, potassium hydroxide solution, sodium carbonate or potassium carbonate, ammonia, triethylamine, triethanolamine, diethylamine, diethanolamine, alkylamines, and the like. Therefore, the PSI may be hydrolyzed either partially or completely.

Low molecular mass fractions can be separated from this solution by customary membrane technology, in the manner of salt water desalination. Alternatively, they may remain in the product.

The temperature during the hydrolysis lies suitably within a range extending up to and including the boiling point of the succinyl-containing suspension or solution, preferably at from 20 to 150° C. The hydrolysis is optionally conducted under pressure. The hydrolysis is optionally conducted with the addition of a further monoethylenically unsaturated carboxylic acid derivative. Suitable examples are maleic anhydride, maleic acid, citraconic acid, itaconic acid, aconitic acid, acrylic acid and fumaric acid.

Under the basic conditions of the hydrolysis, it is possible for an addition reaction of the amino groups of the N-terminal end of the polymer molecule to take place onto the monoethylenically unsaturated carboxylic acid derivative, which is present as a salt.

Depending on the above-described polymerization conditions, the primary polymerization products may also possess ethylenically unsaturated end groups. During the basic hydrolysis, it may therefore be sensible optionally to add aminocarboxylic acids to the reaction mixture, examples being glycine, aspartic acid, lysine, glutamic acid, and the like. This measure brings about grafting of the polymer end groups.

The polymeric free acids can alternatively be liberated from the salts by continuous or batchwise treatment with ion exchangers.

The polymers prepared in accordance with the invention are notable for an improved calcium binding power. In addition, they exhibit complexing properties with respect to heavy metals such as copper, iron, and the like. They can be used as an additive to low-phosphate and phosphate-free laundry detergents and cleaners. The polymers are builders for laundry detergents and, during the washing operation, result in a reduction in encrustation and graying on the washed textile materials.

Furthermore, the polyaspartic acids prepared in accordance with the invention inhibit and retard the precipitation of calcium carbonate, calcium sulphate and calcium phosphate from aqueous solutions and are therefore suitable as water treatment agents. They can be added to the water in cooling circuits, evaporators or salt water desalination plants. In addition, they can be used as deposition inhibitors in the evaporative concentration of sugar juice.

Because of their complexing property with respect to heavy metals, the polymers may also serve as stabilizers for bleaches such as hydrogen peroxide in bleaching processes.

The invention is further illustrated but is not intended to be limited by the following examples in which all parts and percentages are by weight unless otherwise specified.

EXAMPLES

The primary polymerization products were characterized by elemental analysis. In the course of this analysis, three different types of nitrogen were determined in addition to carbon and hydrogen. The analysis distinguished between ionically bonded nitrogen (ammonium ions), hydrolytically sensitive nitrogen (for example, amide or imide nitrogen) and "non-hydrolyzable" nitrogen (amine nitrogen). In this way, it was possible to monitor the optimum hydrolysis required for improved efficacy.

The polymers of the invention obtained after the hydrolysis were analyzed by means of $^1$H-NMR and $^{13}$C-NMR both in the salt form and following conversion to the free acid. The iminodisuccinic acid units were identified on the basis of the chemical shifts of $\delta_1$=3.8 ppm ($^1$H-NMR) and $\delta_2$=55.5 ppm ($^{13}$C-NMR) for the CH groups and of $\delta_3$=2.7 ppm ($^1$H-NMR) and $\delta_4$=36.7 ppm ($^{13}$C-NMR) for the $CH_2$ groups.

The residual-monomer content was determined by HPLC and the polymer distribution by GPC against polyacrylates or polyaspartic acids from the company Sigma as standard.

Example 1

133 g of aspartic acid in 500 ml of acetic acid were mixed dropwise with 103 g of acetic anhydride, with refluxing. During this mixing operation, the internal temperature rose to 120° C. and the aspartic acid went into solution. The reaction solution was held at reflux overnight. Then, under atmospheric pressure, the acetic acid was evaporated off. During this operation the internal temperature rose slowly to 150° C. over 3.5 hours. A vacuum was applied. Here, the temperature rose further to 198° C. with a bath temperature of 220° C. Finally, the internal temperature reached 210° C., which was maintained for one hour and 20 minutes. The reaction mixture was then cooled and pulverized to give 108 g of PSI. $M_W$ 1710, $M_n$ 1243.

For the reaction product of Example 1, a biodegradation of 100% was found in the OECD Screening Test.

Although the present invention has been described in detail with reference to certain preferred versions thereof, other variations are possible. Therefore, the spirit and scope of the appended claims should not be limited to the description of the versions contained therein.

What is claimed is:

1. A process for preparing a biodegradable polymer having repeating succinyl units, the process comprising the steps of:
    (a) mixing (i) a 1,4-butanedicarboxylic acid component comprising a member selected from the group consisting of unsubstituted 1,4-butanedicarboxylic acid, substituted 1,4-butanedicarboxylic acids, 1,4-butanedicarboxylic acid derivatives, with (ii) an acid anhydride to form a mixture;
    (b) reacting the mixture by polycondensation, wherein the polycondensation is brought about by (i) raising the temperature of the mixture to form a component comprising a member selected from the group consisting of polysuccinimides and polyaspartic acids, and (ii) simultaneously converting the acid anhydride to the acid corresponding to the acid anhydride by water that is liberated during the polycondensation; and
    (c) removing water and the acid corresponding to the acid anhydride from the mixture.

2. The process of claim 1, wherein step(c) comprises the step of removing the water and acid by distillation.

3. The process of claim 1, wherein the acid anhydride comprises acetic anhydride.

4. The process of claim 1, wherein the 1,4-butanedicarboxylic acid component comprises aspartic acid.

5. The process of claim 1, wherein (i) the 1,4-butanedicarboxylic acid component comprises aspartic acid, (ii) the acid anhydride comprises acetic anhydride and (iii) the aspartic acid and the acetic anhydride are employed at a ratio of 1:1.

6. The process of claim 1, wherein acid anhydride comprises acetic anhydride and the acetic anhydride is employed in an excess of up to 50 mol %.

7. The process of claim 1, wherein the polycondensation is conducted at a temperature ranging from about 100° C. to 300° C.

8. The process of claim 1, wherein maleic anhydride and a base are metered in toward the end of the polycondensation.

9. The process of claim 1, wherein maleic acid and a base are metered in toward the end of the polycondensation.

10. The process of claim 1, wherein the 1,4-butanedicarboxylic acid component and the acid anhydride are reacted adiabatically.

11. The process of claim 1, wherein the polycondensation is conducted in a thermal polymerization apparatus comprising a delay tube.

12. The process of claim 1, wherein the polycondensation is conducted in a thermal polymerization apparatus comprising a high-viscosity reactor.

13. The process of claim 1, wherein the polycondensation is conducted in a thermal polymerization apparatus comprising a dryer.

14. The process of claim 1, wherein the polycondensation is conducted in a thermal polymerization apparatus comprising a cascade of stirred vessels.

15. The process of claim 1, wherein the polycondensation is conducted in a thermal polymerization apparatus comprising a thin-film evaporator.

16. The process of claim 1, wherein the polycondensation is conducted in a thermal polymerization apparatus comprising a multi-phase helical-tube reactor.

17. The process of claim 1, wherein a component comprising a member selected from the group consisting of the 1,4-butanedicarboxylic acid component and the acid anhydride is metered in at two or more points along a tube reactor.

18. The process of claim 1, wherein a component comprising a member selected from the group consisting of the 1,4-butanedicarboxylic acid component and the acid anhydride is metered in at two or more points along a multi-phase helical-tube reactor.

* * * * *